Figure 1:
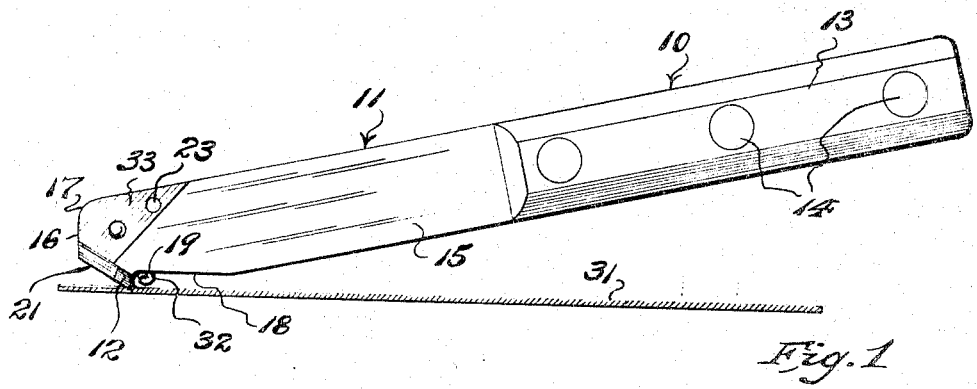

Dec. 5, 1967  W. H. ROTHE  3,355,804
CUTTING AND SCORING TOOL
Filed June 7, 1965

INVENTOR.
William H. Rothe,
BY Richards and Cifelli,
Attorneys

United States Patent Office 3,355,804
Patented Dec. 5, 1967

3,355,804
CUTTING AND SCORING TOOL
William H. Rothe, 44 Bruen Ave., Irvington, N.J. 07111
Filed June 7, 1965, Ser. No. 461,741
1 Claim. (Cl. 30—317)

The present invention relates to an improved cutting or scoring tool especially adapted for use in the building trades.

Although sheets of copper, lead and other metals and certain plastic and composition materials have been used to some extent in the building trades in the past, a definite trend toward the increased use of sheet building materials has come about in recent years due to the development of new construction methods, and the advent of modern plastics, and other compositions, which are especially adapted for use in sheet form. As is well known, it is usually necessary to cut, or score such sheet materials in order to facilitate bending or shaping them for construction purposes. While many tools have been made available for use in such cutting and scoring operations, none of those developed previously has been entirely satisfactory.

For example, many of the available tools of this type are merely holders for the familiar razor blade. While razor blade holders afford a certain degree of protection against laceration for the hands of the user, such tools suffer from the inherent disadvantage that a razor blade, being designed for shaving, is not particularly suitable for the cutting and scoring of sheet materials. More specifically, available razor blades obviously have little utility for cutting or scoring sheet metals unless the latter are very thin and easily worked. This is due to the fact that razor blades are generally made of thin, highly tempered steel, and, therefore, are too light and brittle to be suitable for heavy duty work. Razor blades are also unsuitable for making a deep or curved cut in a stiff or tough material, for example, since the brittle blades tend to snap under such stress thus requiring replacement. Moreover, razor blade holding devices, while suitable for certain light duty cutting operations, are of little or no value as scoring tools, since it is extremely difficult to regulate or control the depth of the score line. The reason for this is that, due to the thinness of the razor blade, only slightly more pressure is required to make a deep score, or indeed to cut through a thin material, than to make a shallow score line. This leads to frequent spoilage of the work piece when it is not desired to cut deeply, since the workman cannot easily regulate the depth of his cut.

Other scoring tools having more permanent cutting edges have also been made available. While such tools have the advantages that they are generally less subject to breakage than razor blades, and may be suitable for scoring some materials, they require frequent sharpening by grinding, honing or other suitable means. This makes it necessary for a workman to carry several such tools, or to interrupt his work to resharpen the scoring tool at rather frequent intervals. Since it may require from 5 to 10 minutes to hone the edge of such a tool, this can seriously reduce the efficiency and hourly output of the workman.

Moreover, none of the cutting and scoring tools previously available to the building trades have been capable of not only cutting substantially all types of metal, plastic and other sheet materials, but also of making a smooth, uniform, score line of controlled depth in such materials.

Therefore, it is a primary object of this invention to provide a novel cutting and scoring tool, especially adapted for use in the building trades, which is capable of making a smooth, uniform score line of controlled depth in sheet or other building materials.

It is another object of the invention to provide such a tool having a removable strong, hard, durable blade which provides a high degree of control over the depth of the score line, and which can be replaced when dull without loss of time.

It is still another object of the invention to provide a cutting or scoring tool adapted to remove a narrow strip of a work piece from the score line in the form of a long curl, thus simultaneously providing a tangible and visual check on the depth of the score line, and permitting positive control of the waste strip when necessary or desired.

It is yet another object of the invention to provide a cutting or scoring tool, the cutting edge of which may be maintained at the optimum angle to the work piece during use by reference to visual guide means provided on the tool for that purpose.

It is still another object of the invention to provide a cutting and scoring tool having means to safeguard the cutting edge against damage or dulling when not in use.

It is yet another object of the invention to provide a safe cutting and scoring tool which minimizes the possibility of laceration of the operator, both when the tool is in use and when it is carried in the user's pocket or tool kit.

Figure 2:
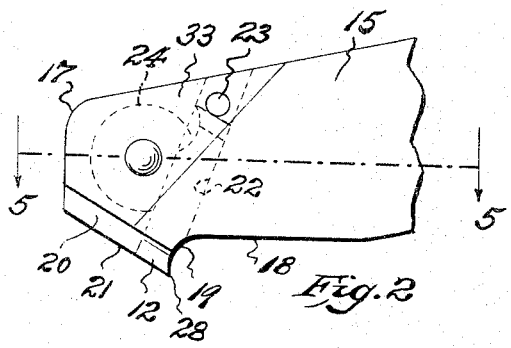
Figure 3:
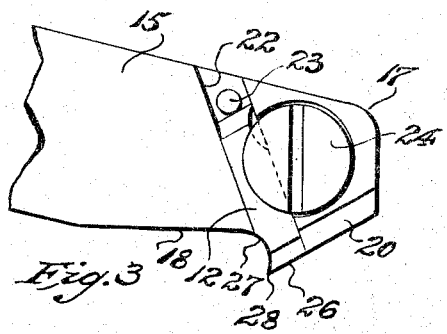
Figure 4:
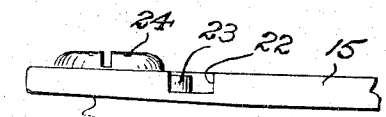
Figure 5:
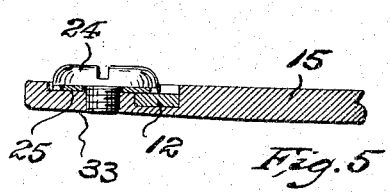
Figure 6:
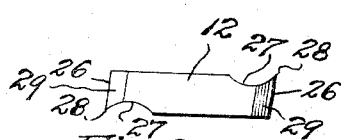
Figure 7:
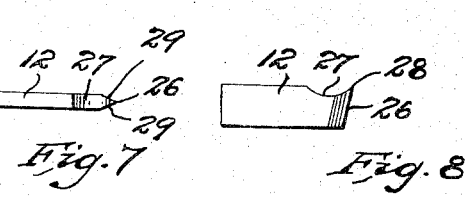
Figure 8:
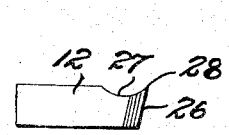
Figure 9:
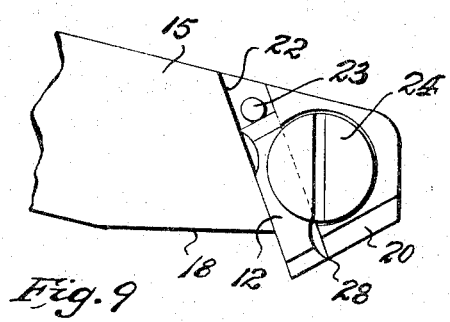

The above and other objects, which will be apparent from the following description, are attained by the novel cutting tool and blades of the present invention, which comprise a cutting member having a transverse face, which face has at its lower end a transversely V-shaped cutting point formed by a pair of beveled surfaces meeting in a sharp edge terminating at the apex of the cutting point. An illustrative embodiment of the invention is shown in the accompanying drawings in which:

FIG. 1 is a front face view of the complete tool, shown in operation;
FIG. 2 is a fragmentary front face view;
FIG. 3 is a fragmentary rear face view;
FIG. 4 is a fragmentary top edge view;
FIG. 5 is a longitudinal sectional view taken on the line 5—5 of FIG. 2;
FIG. 6 is face view of a double-ended blade;
FIG. 7 is a top edge view of the blade of FIG. 6;
FIG. 8 is a face view of a single-ended blade; and
FIG. 9 is a fragmentary rear face view of the tool with the double-ended blade revised so as to protect the outer cutting edge or point against damage and dulling, and to render the tool safe to carry when not in use.

FIGS. 2 to 9 inclusive are drawn on an enlarged scale with respect to FIG. 1.

Referring now to the drawings in greater detail, like characters of reference indicate corresponding parts. The tool comprises a handle 10, a blade holder 11, and a blade 12. The handle may be of any suitable size, shape and material adapted to provide comfort for the hand of the user. The handle 10 shown in FIG. 1 consists of two handle members 13 one of which is positioned on each side of the blade holder 11 at one end thereof. The resulting 3-piece handle is fastened together by means of rivets 14 extending through members 13 and blade holder 11.

The blade holder 11, which may be composed of any suitable material such as steel, for example, has a stiff shaft 15 which, in the illustrated embodiment, takes the form of a flat bar, although any other suitable configuration could be used. The end of the shaft 15 away from the handle is provided with a smooth, preferably flat end 16. The rounded portion 17 of the shaft adjacent the end 16 provides a smooth and comfortable support and pressure point for the downwardly flexed end joint of the forefinger of the user when the handle is held in the palm of the hand and the forefinger is extended along the top of the shaft. The lower edge of the shaft 15 is cut away at 18 to provide space between that portion of the tool and the work piece 31. The flat run 18, at the end away from the handle, is provided with an outwardly curved portion 19 which terminates adjacent to the blade 12. The shaft 15 is also provided with two beveled areas 20, one disposed on each side of the shaft, to form a V-shaped cross-section with the beveled surfaces 20 meeting in a sharp edge 21. The edge 21, while sharp, is not the primary cutting edge of the scoring tool as will be explained below.

The rear face of the scoring tool is provided with a slot 22 which traverses the shaft 15 at an angle and which is adapted to receive the blade 12 in sliding fit. The slot 22 is provided with a stop pin 23 which acts to arrest the sliding movement of the blade 12 so that the latter is correctly positioned in the slot with the primary cutting edge of said blade in the in-use position shown in FIGS. 1, 2 and 3. The blade 12 is retained in the slot 22 by means of a set screw 24 having a transverse slot in its enlarged head to permit it to be manipulated by means of a coin, screw driver or other suitable implement. A lock washer 25 is employed between the blade 12 and the under side of the head of the set screw 24 in order to provide a secure and reliable grip on the blade, and to prevent accidental loss of the blade due to loosening of the set screw.

The blade 12 may be single-ended as shown in FIG. 8 or double-ended as shown in FIG. 6; the latter being preferred. The cutting end of the blade 12 comprises a sharp straight cutting edge 26 in conjunction with an inwardly curved surface 27, terminating in the cutting point 28. The edge 26 is the apex of a V-shaped cross section formed by two bevels 29 as best seen in FIG. 7. The longitudinal sides of blade 12 are generally straight to provide extended surfaces for contact with the sides of the slot 22 to steady the blade in the shaft 15. The butt end of a single-ended blade as shown in FIG. 8 may be of generally rectangular or any other suitable shape. The curved surfaces 27 and cutting points 28 of the cutting members at opposite ends of a double-ended blade may be disposed on the same or opposite sides of the blades 12, as desired. It is preferred to have the two cutting points on opposite sides of the blade since such an arrangement provides a longer straight edge on each side of the blade, thus providing more extensive contact with the sides of the slot 22 in order to steady the blade in use. As may be seen in FIG. 7, the edges of the bevels 29 opposite the primary cutting point 28 may be provided in turn with bevels 30, if desired.

The front face of shaft 15 of the blade holder 11 is provided with a shallow longitudinally beveled surface 33 as seen in FIGS. 4 and 5, and as shown by shading in FIG. 1. The bevel 33 serves to reduce the thickness of the blade holder 11 at the forward end of the tool thus permitting the tool to be operated close to a surface at right angles to the work piece, such as the wall, floor or ceiling of a room for example. It should be noted, however, that the beveled surface 33 does not reduce the thickness of the shaft 15 adjacent the operative end of the blade 12 where structural strength is desired.

The shape of the cutting portion of the blade 12 is an important aspect of the present invention since it provides a scoring tool adapted to make a smooth, uniform score line of controlled depth by removal of a strip of the work piece in a long curl, as shown in FIG. 1. More specifically, the advantages of the present invention are provided in large part by the use of a cutting member having a V-shaped transverse cross-section in conjunction with a longitudinally curved surface 27 terminating in the primary cutting point 28, the latter being formed by the conjuncture of the curved surface 27 and the apex of the V-shaped cross-section formed by bevels 29.

The V-shaped cross-section provides control of the depth of the cut since the sides of the V, bevels 29, uniformly resist penetration of the work piece. This is due to the fact that when the cutting tool is drawn across a work piece, the point 28 penetrates the surface of the work piece to a certain depth determined by the nature of the material and the pressure applied by the tool. Further penetration of the work piece can be achieved by increasing the pressure on the cutting edge; the depth of penetration being directly proportional to the pressure applied. Due to the sloping sides of the V-shaped cross section, the increment of pressure required to provide a given increase in the depth of penetration is substantial. This factor makes it possible for the operator to make a score line of uniform depth by merely maintaining a reasonably uniform pressure on the tool as it is drawn across a work piece. Small variations in the pressure on the tool do not cause large variations in the depth of pentration as is the case with a blade of relatively uniform thickness such as the familiar razor blade, which lacks the V-shaped cross-section having a substantial included angle at the apex of the V. While the benefit of the V-shaped cross-section may be obtained in varying degrees over a wide range of included angles, this range has practical limits. If the included angle of the V-shaped cross-section is too small, only a slight variation in pressure will be required to produce a substantial increase in penetration, as is the case with a razor blade or other "thin" blade. On the other hand, if the included angle of the V-shaped cross-section is too large, a very substantial increase in pressure would be required to produce greater penetration, and the tool would be rendered incapable of producing deep score lines with ordinary manual pressure. It has been found that tools satisfactory for most purposes may be made with a cutting edge having a V-shaped cross-section with an included angle of from about 15 to 60°; angles of about 20 to 45° being preferred, and an angle of about 30° having been found especially suitable for general use.

The degree of curvature of the surface 27 is not critical, but must be substantial in order to effectively reduce the friction between the cutting point 28 and the work piece 31. A suitable curvature would be such that the included angle between the curved surface 27 and the sharp edge 26 of the blade would be about 15 to 60°, and preferably about 20 to 40°; an angle of about 30° being especially suitable. It should be noted here that the angle between the edge 26 and the side edge of the blade is somewhat more than 90° in order to correspond to edge 21 of the holder. The curved surface 27 provides a smooth ramp over which the curl 32 may slide as it is removed from the work piece 31. Without the curved surface 27, the strip removed from the work piece would be jammed against the flat end of the V-shaped cross section, thus increasing friction and breaking the removed material into small waste chips. It will be seen, therefore, that the curved surface 27 in conjunction with the V-shaped cross-section provided by bevels 29, produces a cutting member adapted to be drawn smoothly across the surface of a work piece with only a desired minimum of friction to produce a uniform score line of controlled depth by removing a strip of the work piece in the form of a long curl.

As noted above the blades 12 may be either single- or double-ended, i.e. they may have one or two primary cutting points 28. The double-ended blade is preferred since when one cutting point 28 becomes dull from use, the blade can be quickly reversed in the blade holder 11 in order to provide a new cutting point without delay. The blades 12 are preferably formed from carbide steel in order to provide a hard, durable and long lasting blade, which will remain sharp for a substantial period of time under normal use conditions. Such blades, particularly if double-ended, obviate the necessity for the workman to carry a number of scoring tools, since a single tool and blade remains operable for long periods without the need for grinding or honing of the cutting edge on the job. The blades 12 may be resharpened as necessary by honing or other suitable means after long use.

The replacement or reversal of the blade 12 in the holder 11 is a simple operation which may be completed in a matter of seconds. The set screw 24 is merely turned slightly by the use of a coin, screw driver or other device inserted in the slot in the head of the screw. Due to the size of the threads used on the preferred set screw, only about ⅓ to ½ a turn of the screw is sufficient to release the blade 12 for reversal or replacement. After the blade is removed and reversed the set screw is tightened by the use of a coin, for example, until finger pressure tight; such pressure being sufficient to bring the under side of the head of the set screw into tight contact with the blade 12 and thus hold it firmly in operable. The lock washer 25 prevents accidental loosening of the set screw.

It will be seen by reference to FIG. 9 that the blade 12 may be inserted in the slot 22 so that the cutting point 28 is adjacent the safety guard of the blade holder 11 formed by the beveled surfaces 20. In this way the cutting point 28 is protected against damage and dulling by contact with other tools in a tool chest, for example, when not in use. Moreover, the cutting point 28, when thus guarded, cannot cause injury if carried in the pocket or otherwise placed in contact with the body. Although the edges 21 and 26 are exposed, these edges while described above as sharp, are not sufficiently sharp to lacerate the skin on normal contact.

As noted above the angle at which the scoring tool is applied to the work piece has an effect on the operation of the tool. This angle may be varied to suit the preference of the individual workman, or the requirements of the job at hand. It has been found that an angle of about 20 to 60° and preferably 30° between the handle of the tool and the work piece provides both efficient cutting or scoring action and comfort to the user. The scoring tool illustrated in the drawings is designed to be operated by pulling or drawing it over the work piece at about a 30° angle. When the tool is operated at this angle the straight edge 18 is parallel to the work piece, and the forward edge 16 of the tool is perpendicular to the work piece. Therefore, the edges 16 and 18 provide visual guides for the operator to indicate when the tool is being operated at the optimum angle of 30° with the work piece.

It will be apparent to those skilled in the art that the new scoring tool provides a markedly improved means for scoring and/or parting sheet building materials of all types, and that it possesses many advantages over similar tools of the prior art. Among these advantages, the positive control provided by the novel shape of the cutting edge which makes it possible to produce a score line of uniform depth without special skill, and to remove a strip from the work piece in the form of a long curl, are among the most important advantages of those enumerated above.

Although the invention has been particularly described in conjunction with a preferred embodiment thereof shown in the drawings, it should be understood that this embodiment is merely illustrative and is not to be construed as limiting the scope of the appended claim.

What is claimed is:

In a cutting tool to be manually drawn across the surface of a work piece and which comprises a handle, elongated shaft means extending from the handle, and a blade removably mounted in said shaft, the improvement which comprises, providing said shaft with a straight-sided slot in the forward portion thereof, said slot traversing the shaft with the straight edges of the slot at an angle with respect to the longitudinal edges of the shaft, said blade including a body portion and a cutting member adjacent at least one end thereof, the body portion of said blade having straight sides and being dimensioned so as to closely and slidably fit within the straight sided slot, means for positioning said blade in said slot at a predetermined position relative to said shaft whereby the cutting member of said blade projects from said slot, and means to releasably lock said blade in said slot, said cutting member having a transverse face, said face having at the lower end thereof a transversely V-shaped cutting point formed by a pair of beveled surfaces meeting in a sharp edge terminating at the apex of said point, said transverse face and cutting point being concavely curved in the longitudinal direction, said shaft having a portion of the lower edge thereof adjacent the forward end cut away to form a concavely curved surface adjacent the concavely curved face and cutting point of said cutting member when said blade is in operative position in said slot, the two concavely curved surfaces together forming a smooth continuous concavely curved surface adjacent the cutting point over which surface a curl of material removed from a work piece by drawing the tool thereover may ride smoothly without breaking, and guard means adjacent the forward end of said shaft, said blade being adapted to fit in said slot in reverse non-operative position with the cutting point thereof adjacent to and protected by said guard means when the tool is not in use.

References Cited

UNITED STATES PATENTS

| 2,255,196 | 9/1941 | Taylor | 30—168 |
| 2,537,287 | 1/1951 | Thomas | 30—294 |
| 2,653,382 | 9/1953 | Twiss | 30—317 |

OTHER REFERENCES

| 488,796 | 12/1952 | Canada. |
| 891,245 | 9/1953 | Germany. |

JAMES L. JONES, Jr., *Primary Examiner.*